(12) United States Patent
Xu et al.

(10) Patent No.: US 12,386,575 B2
(45) Date of Patent: Aug. 12, 2025

(54) METHODS AND APPARATUS FOR PARTIAL DISPLAY OF FRAME BUFFERS

(71) Applicant: QUALCOMM Incorporated, San Diego, CA (US)

(72) Inventors: Yongjun Xu, Beijing (CN); Nan Zhang, Beijing (CN); Bo Yu, Shanghai (CN); Junjie Li, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 17/792,392

(22) PCT Filed: Jan. 13, 2020

(86) PCT No.: PCT/CN2020/071778
§ 371 (c)(1),
(2) Date: Jul. 12, 2022

(87) PCT Pub. No.: WO2021/142574
PCT Pub. Date: Jul. 22, 2021

(65) Prior Publication Data
US 2023/0040998 A1     Feb. 9, 2023

(51) Int. Cl.
*G06F 3/14*     (2006.01)
*G06T 1/20*     (2006.01)

(52) U.S. Cl.
CPC .......... *G06F 3/1431* (2013.01); *G06F 3/1446* (2013.01); *G06T 1/20* (2013.01)

(58) Field of Classification Search
CPC ........ G06F 3/1431; G06F 3/1446; G06T 1/20
See application file for complete search history.

(56) References Cited

U.S. PATENT DOCUMENTS

| 8,112,513 B2 * | 2/2012 | Margulis ................. H04L 67/10 709/224 |
| 2009/0147177 A1 | 6/2009 | Lee et al. |

(Continued)

FOREIGN PATENT DOCUMENTS

| CN | 101162575 A | 4/2008 |
| CN | 101697114 A | 4/2010 |

(Continued)

OTHER PUBLICATIONS

International Search Report and Written Opinion—PCT/CN2020/071778—ISA/EPO—Oct. 15, 2020.

(Continued)

*Primary Examiner* — Grace Q Li
(74) *Attorney, Agent, or Firm* — Procopio, Cory, Hargreaves & Savitch LLP (57) ABSTRACT

The present disclosure relates to methods and apparatus for display processing. Aspects of the present disclosure can communicate an image to multiple display panels, where the multiple display panels include a first display panel and a second display panel. Further, aspects of the present disclosure can divide the image between the first display panel and the second display panel. Additionally, aspects of the present disclosure can scale at least one of a first portion of the image or a second portion of the image to at least one of the first display panel and the second display panel. Aspects of the present disclosure can also display at least one of the scaled first portion of the image or the scaled second portion of the image on at least one of the first display panel or the second display panel.

13 Claims, 5 Drawing Sheets

(56) References Cited

U.S. PATENT DOCUMENTS

| | | | |
|---|---|---|---|
| 2010/0066643 A1 | 3/2010 | King et al. | |
| 2012/0162158 A1* | 6/2012 | Choi | G06F 3/1438 |
| | | | 345/204 |
| 2014/0298156 A1* | 10/2014 | Liang | G06F 16/9577 |
| | | | 715/234 |
| 2015/0103101 A1* | 4/2015 | Lee | G06F 3/1446 |
| | | | 345/667 |
| 2016/0191841 A1* | 6/2016 | Yoo | G06F 3/01 |
| | | | 348/564 |
| 2017/0192733 A1 | 7/2017 | Huang et al. | |
| 2018/0203660 A1 | 7/2018 | Hwang et al. | |
| 2022/0278172 A1* | 9/2022 | Kubota | H10K 59/40 |

FOREIGN PATENT DOCUMENTS

| | | |
|---|---|---|
| CN | 102857738 A | 1/2013 |
| CN | 106415697 A | 2/2017 |
| CN | 110431616 A | 11/2019 |

OTHER PUBLICATIONS

Supplementary European Search Report—EP20913455—Search Authority—Munich—Aug. 29, 2023.

\* cited by examiner

METHODS AND APPARATUS FOR PARTIAL DISPLAY OF FRAME BUFFERS

This application is National Stage Application filed under 35 U.S.C. § 371 of PCT International Application Serial No. PCT/CN2020/071778, entitled "METHODS AND APPARATUS FOR PARTIAL DISPLAY OF FRAME BUFFERS" and filed Jan. 13, 2020, which is expressly incorporated by reference herein in its entirety.

TECHNICAL FIELD

The present disclosure relates generally to processing systems and, more particularly, to one or more techniques for display processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Typically, a GPU of a device is configured to perform the processes in a graphics processing pipeline. However, with the advent of wireless communication and smaller, handheld devices, there has developed an increased need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a central processing unit (CPU), a graphics processing unit (GPU), or any apparatus that can perform graphics processing. The apparatus can communicate an image to multiple display panels, where the multiple display panels include a first display panel and a second display panel. Further, the apparatus can divide the image between the first display panel and the second display panel. Additionally, the apparatus can scale at least one of a first portion of the image or a second portion of the image to at least one of the first display panel and the second display panel. The apparatus can also display at least one of the scaled first portion of the image or the scaled second portion of the image on at least one of the first display panel or the second display panel.

The details of one or more examples of the disclosure are set forth in the accompanying drawings and the description below. Other features, objects, and advantages of the disclosure will be apparent from the description and drawings, and from the claims.

DETAILED DESCRIPTION

Certain chipsets or display panels may include a number of limitations, such as not supporting panel stacking logic or requiring porting. A split link feature may help for some resolution use cases. There are also a number of other limitations for chipsets and display panels. For example, almost all uses may go to a GPU composition because of a source split, which can introduce a frame drop and a power increase. Accordingly, there is a present need for a partial display from a full-size frame buffer that solves the aforementioned problems. Aspects of the present disclosure can include a novel design for a partial display from a full-size frame buffer in a display module. In some aspects, this can help to drive two display panels to show different contents with a single DSI interface and at a minimal cost.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

Figure 1:
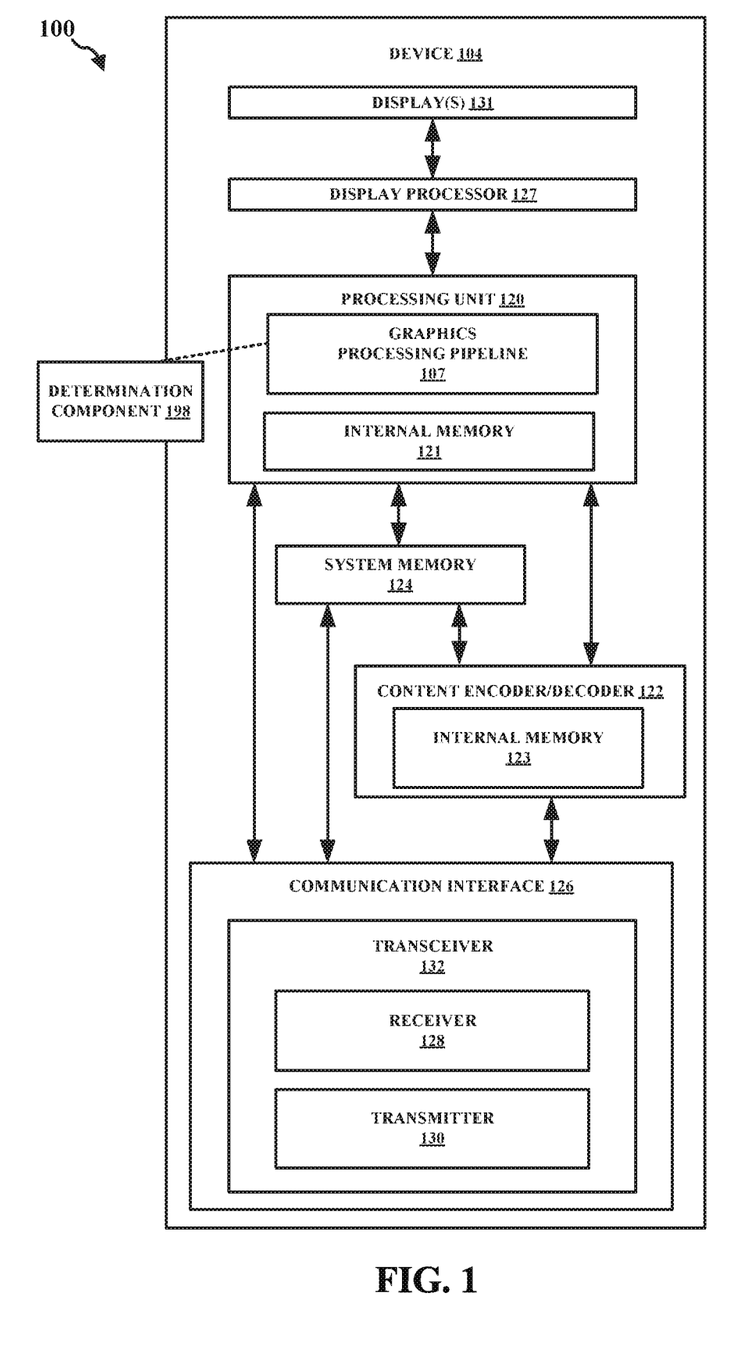
FIG. 1 is a block diagram that illustrates an example content generation system in accordance with one or more techniques of this disclosure.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to communicate an image to multiple display panels, where the multiple display panels include a first display panel and a second display panel. The determination component 198 can also be configured to divide the image between the first display panel and the second display panel. The determination component 198 can also be configured to scale at least one of a first portion of the image or a second portion of the image to at least one of the first display panel and the second display panel. The determination component 198 can also be configured to display at least one of the scaled first portion of the image or the scaled second portion of the image on at least one of the first display panel or the second display panel.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
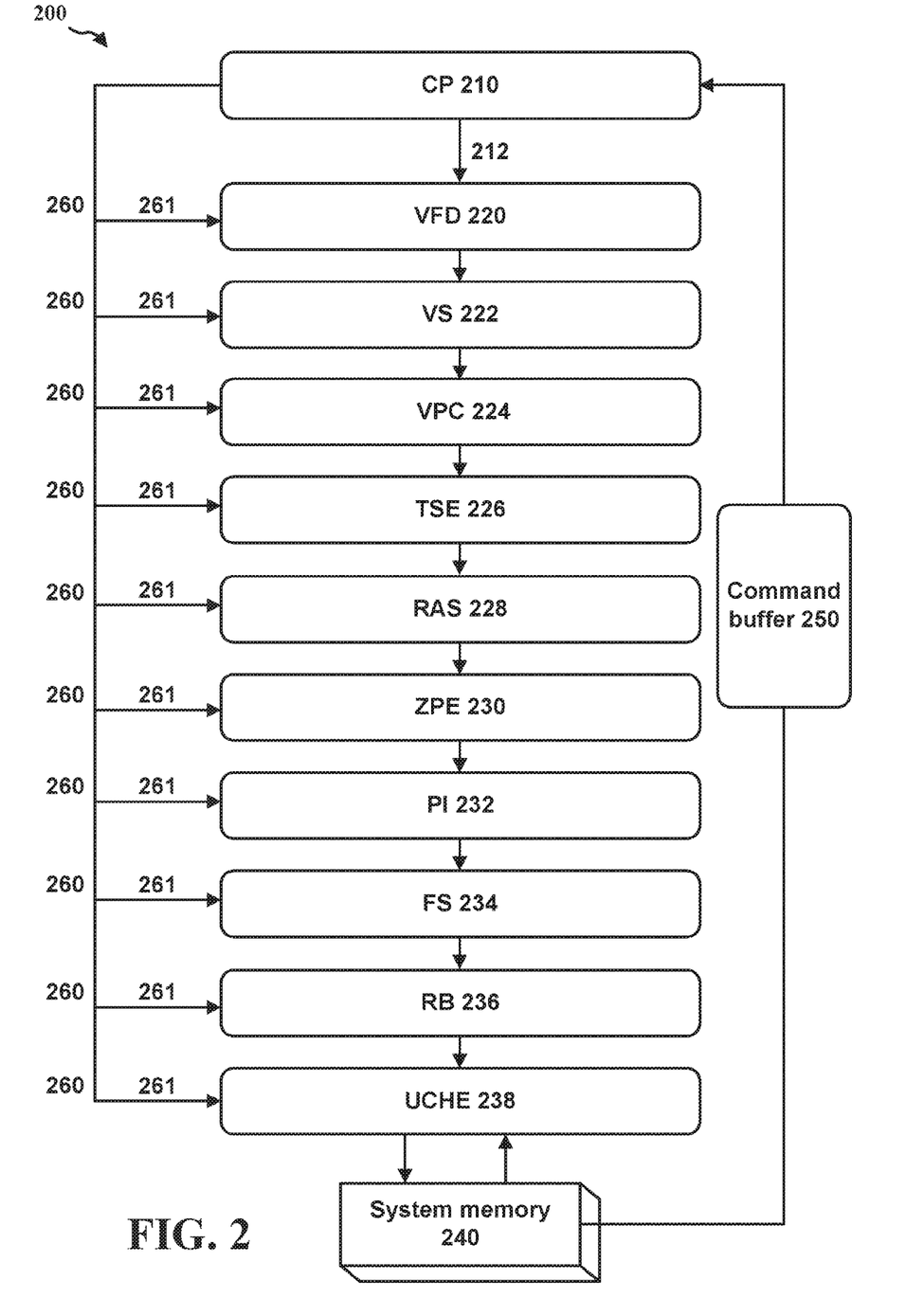
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

GPUs can render images in a variety of different ways. In some instances, GPUs can render an image using rendering or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects, during a binning pass, an image can be divided into different bins or tiles. In some aspects, during the binning pass, a visibility stream can be constructed where visible primitives or draw calls can be identified.

In some aspects, GPUs can apply the drawing or rendering process to different bins or tiles. For instance, a GPU can render to one bin, and perform all the draws for the primitives or pixels in the bin. During the process of rendering to a bin, the render targets can be located in the GMEM. In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface.

Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible, e.g., in the rendering pass. Also, at least some of the primitives that are identified as visible can be rendered in the rendering pass.

Some product markets, such as internet of everything (TOE) and automotive markets, can utilize advanced wireless communication technology and mobile platforms. Also, a point of sale (POS) machine is one area of a wireless or mobile platform that is currently being focused on. A modern desktop POS machine, also referred to as an electronic cash register (ECR) at supermarkets or small businesses, may need an Internet connection to a cloud or server and up two display panels. For instance, one display can be for a cashier to process all types of payments, and the other display can be for a customer to review the progress or watch some video advertisements. Chipsets for POS devices can support high speed wireless access, as well as be equipped with two display serial interface (DSI) ports, which can support a maximum resolution, e.g., up to full high definition (FHD) or 1080×1920 resolution.

Chipsets can also be used for POS projects, such as upgraded versions with more powerful CPUs and GPUs. In some aspects, two DSI ports and two layer mixers (LMs) can be reduced to one DSI port and one LM for cost saving. Additionally, a display processing unit (DPU) reduction may be fine for the mobile market since it is for middle and low tier smartphones, as one primary display, e.g., with FHD at 60 Hz resolution, may be sufficient. In some instances, it has been anticipated up to 50% of further face pay devices may need dual display support. The DPU reduction has one challenge for the POS market since there may be a single DSI port. One problem may be how to support two independent display panels with different content with a single DSI interface.

In automotive systems, panel stacking was developed to provide multiple logical displays sitting on the same physical interface and provide independent functionality to each display. Also, there are bridge chips that take one frame buffer with both displays and split it into two streams. Additionally, there may be the advantage of inserting dummy lines to allow for two different resolutions.

Split link can be defined to support a DSI transmitter that connects to two, three, or four DSI Receivers. In some aspects, the primary purpose can be for tablet design, and it can be reused to support two displays with different content with few limitations. Certain chipsets may not support panel stacking logic, and the display driver may need some porting from an automotive project. A split link feature may help for the same resolution use case, and it may need some software work.

Both of the aforementioned solutions may include other limitations for chipsets. For example, almost all uses cases go to GPU composition because of a source split, which can introduce a frame drop and a power increase. However, some aspects of an SSPP pipe and LM may have width limitations, e.g., less than 2160, and may not support 2×FHD, e.g., 3840×1080 resolution. Accordingly, there is a present need for a partial display out of a full-size frame buffer that solves the aforementioned problems.

Aspects of the present disclosure can include a novel design for partial display from a full-size frame buffer in a display module. In some aspects, this can help to drive two display panels to show different contents with a single DSI interface with a minimum cost. Partial display for full-size frame buffers in display module can include a number of different features. For instance, a display module may receive a full-size frame image data with a display interface. For some designs, the full-size frame resolution can be 2×FHD, e.g., 1920×2160 resolution.

In some aspects, a display module need some special design to ignore some images per line or per region. By doing so, a portion of the full-size frame image data may be shown on display panel. For example, a panel A may show a top portion of a screen, e.g., 1920×1080. The display region can also be specified by hardware, or be configured in run time with display command set (DCS) command, as both display region position and size can be configurable.

Additionally, the display region size can be the same or different from the display physical resolution. For instance, if the region size and the physical resolution is different, the display driver can scale the image to match a physical resolution. For example, a physical resolution of a panel B can be 720p, and the display driver can scale the bottom portion of the frame buffer, e.g., scale it from 1920×1080 to 1280×720. In some use cases, the two display modules may have a different configuration, so aspects of the present disclosure can send a panel specified DCS command. For example, DCS command A can be recognized by panel A, and the command can be ignored by panel B.

Figure 3:
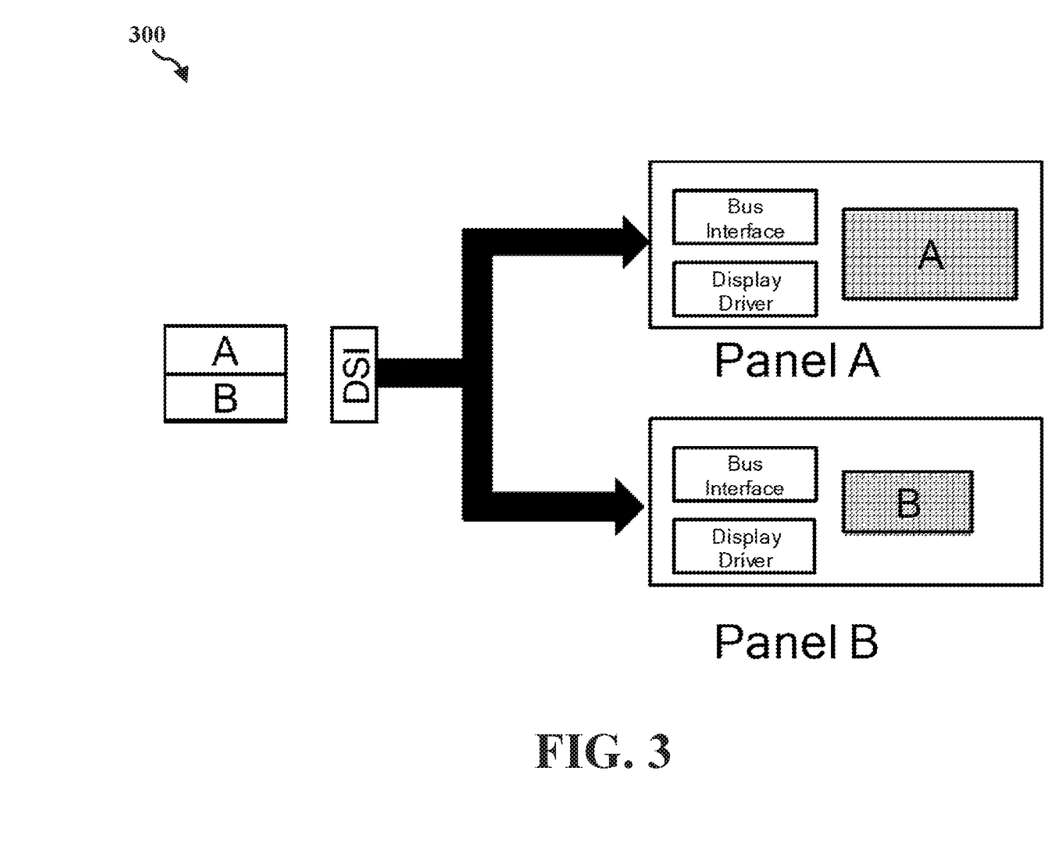
FIG. 3 illustrates an example display architecture in accordance with one or more techniques of this disclosure.

FIG. 3 illustrates a display architecture 300 in accordance with one or more techniques of this disclosure. As shown in FIG. 3, a whole frame image can be sent to two panels, e.g., panel A and panel B. Then a DSI can split the image into a top portion of the image and a bottom portion of the image. In some aspects, the top portion can correspond to panel A, and the bottom portion can correspond to panel B. Also, the top portion can be 1080p resolution, and the bottom portion can be 720p resolution. Further, both panel A and panel B can include a bus interface and a display driver.

Some aspects of the present disclosure can include a solution to drive two display panels to show different contents with a single DSI interface. For instance, the DSI interface can contains one SOC with one DSI port. Also, the DSI interface can include two video mode display panels with the same display driver integrated circuit (DDIC), as well as the same initial sequence and operations. Moreover, the panel resolution can be same or different. In some designs, the two panel resolution can be landscape FHD, e.g., 1920×1080. In some aspects, for connection from a DSI port to two display panels, the display panel and connector can be designed as 1-to-2 switch or a DSI bridge IC.

Aspects of the present disclosure can also include a number of shipset designs. For instance, the design on the chipset side can be the display resolution of 2×FHD, e.g., 1920×2160. Some aspects can work on multi-windows mode, and the display window can be a horizontal split as top and bottom portions. Also, the applications to a cashier can be located at top portion, and the applications to clients can be located at a bottom portion. Further, the two parts resolution can be the same or different based on a panel configuration. In some aspects, the size of both portions can be FHD, e.g., 1920×1080. Additionally, the whole frame image data, e.g., 2×FHD 1920×2160, can be sent to two display panels with a single DSI port.

Figure 4:
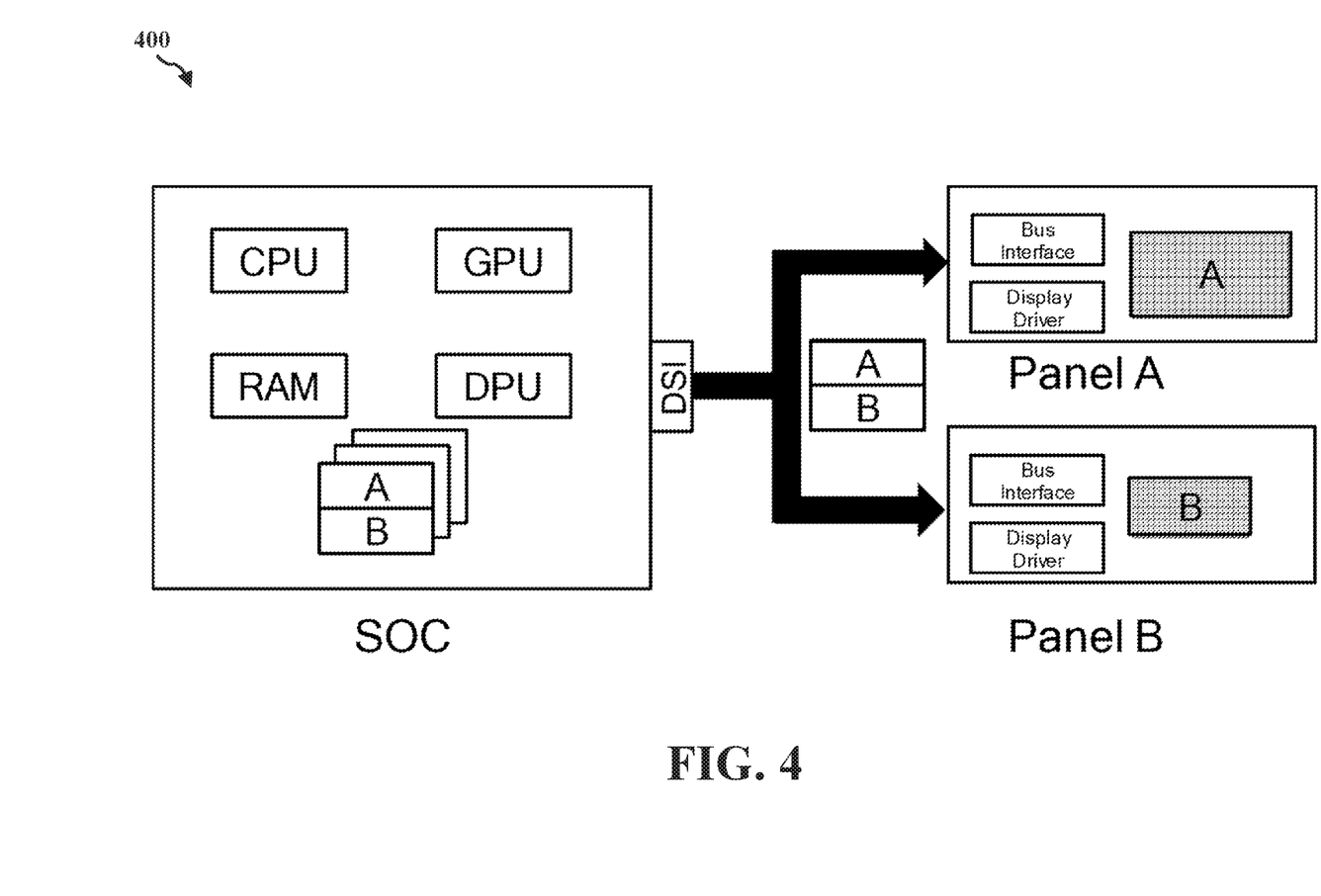
FIG. 4 illustrates an example display architecture in accordance with one or more techniques of this disclosure.

FIG. 4 illustrates a display architecture 400 in accordance with one or more techniques of this disclosure. As shown in FIG. 4, an SOC can include a CPU, a GPU, a RAM, and a DPU, which can include multi-window mode. Also, the DSI can split the image to a first panel and a second panel, e.g., panel A and panel B. At panel A, a top portion of the image may be shown. At panel B, a bottom portion of the image may be shown. In some aspects, the entire image can be sent to the two panels. Both panel A and panel B can also include a bus interface and a display driver.

In some aspects, the multiple display modules may be equipped with different resolutions. Also, the bus interface can accept the same whole frame image, but each display driver can drive a different resolution panel using different portion of the frame image. As shown in FIG. 4, the first panel resolution can be 1080p and the second panel resolution can be 720p, e.g., 1280×720. Also, the display driver can scale the whole bottom half image, e.g., 1080p, to panel resolution, e.g., 720p. Moreover, the display driver crop one 720p region from the bottom half image and send it to the panel. Some layouts can be adjusted based on the exact panel configuration.

Aspects of the present disclosure can help SOCs in the POS market with a number of advantages. For instance, the present disclosure can help SOCs to support display stacking. Also, there may be no unnecessary software development workload.

Figure 5:
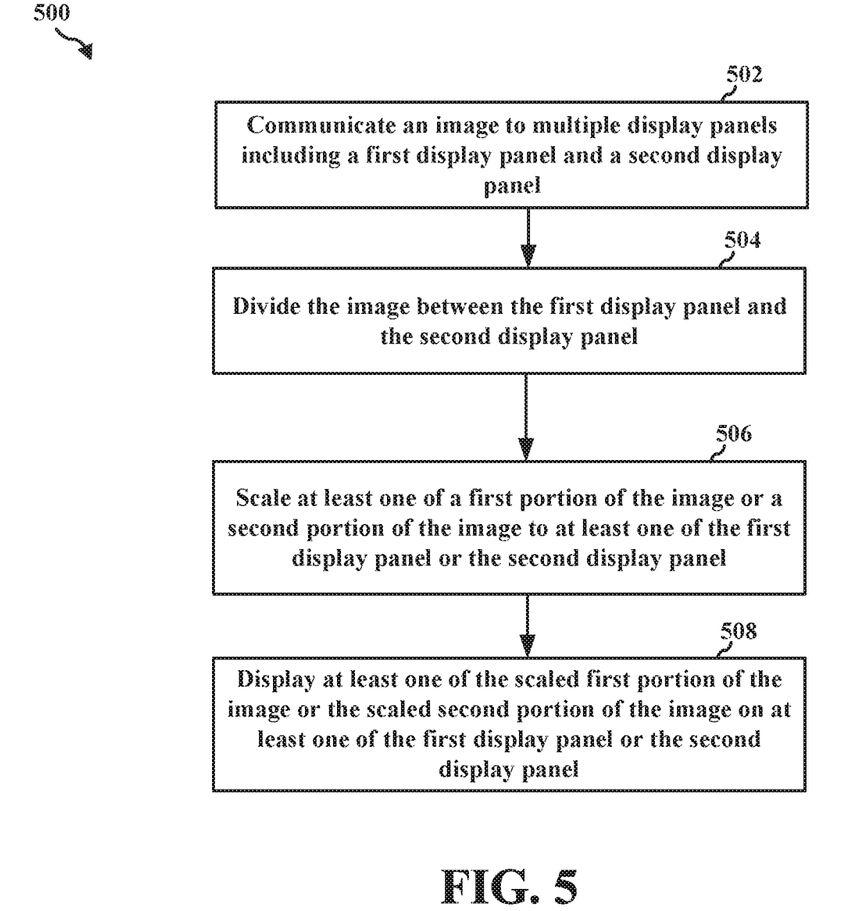
FIG. 5 illustrates an example flowchart of an example method in accordance with one or more techniques of this disclosure.

FIG. 5 illustrates a flowchart 500 of an example method in accordance with one or more techniques of this disclosure. The method may be performed by an apparatus such as a display processing unit (DPU), a CPU, a GPU, or an apparatus for display processing.

At 502, the apparatus may communicate an image to multiple display panels, where the multiple display panels include a first display panel and a second display panel, as described in connection with the examples in FIGS. 3 and 4.

At 504, the apparatus may divide the image between the first display panel and the second display panel, as described in connection with the examples in FIGS. 3 and 4.

At 506, the apparatus can scale at least one of a first portion of the image or a second portion of the image to at least one of the first display panel and the second display panel, as described in connection with the examples in FIGS. 3 and 4.

At 508, the apparatus can display at least one of the scaled first portion of the image or the scaled second portion of the image on at least one of the first display panel or the second display panel, as described in connection with the examples in FIGS. 3 and 4.

In some aspects, at least one of a position or a size of the first portion of the image can be configurable and at least one of a position or a size of the second portion of the image can be configurable, as described in connection with the examples in FIGS. 3 and 4. Also, the first portion of the image and the second portion of the image can be configured with a display command or a control command, as described in connection with the examples in FIGS. 3 and 4. Additionally, the first display panel can correspond to the first portion of the image and the second display panel can correspond to the second portion of the image, as described in connection with the examples in FIGS. 3 and 4.

In some instances, the image can be divided using a multi-window technique based on at least one of a CPU or a GPU, as described in connection with the examples in FIGS. 3 and 4. Also, the image can be divided by at least one of a display driver or a display controller, as described in connection with the examples in FIGS. 3 and 4. In some aspects, at least one of the first display panel and the second display panel can include a bus interface or a display driver, as described in connection with the examples in FIGS. 3 and 4. Further, the displayed first portion of the image can include a first resolution and the displayed second portion of the image can include a second resolution, as described in connection with the examples in FIGS. 3 and 4.

In one configuration, a method or apparatus for display processing is provided. The apparatus may be a DPU, a CPU, a GPU, or some other processor that can perform display processing. In one aspect, the apparatus may be the processing unit 120 within the device 104, or may be some other hardware within device 104 or another device. The apparatus may include means for communicating an image to multiple display panels, where the multiple display panels include a first display panel and a second display panel. The apparatus may also include means for dividing the image between the first display panel and the second display panel. The apparatus may also include means for scaling at least one of a first portion of the image or a second portion of the image to at least one of the first display panel and the second display panel. The apparatus may also include means for displaying at least one of the scaled first portion of the image or the scaled second portion of the image on at least one of the first display panel or the second display panel.

The subject matter described herein can be implemented to realize one or more benefits or advantages. For instance, the described display processing techniques can be used by a DPU, a GPU, a CPU, or some other processor that can perform graphics processing to implement the partial display techniques described herein. This can also be accomplished at a low cost compared to other display processing techniques. Moreover, the display processing techniques herein can improve or speed up data processing or execution. Further, the graphics processing techniques herein can improve resource or data utilization and/or resource efficiency.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of display processing, comprising:
   communicating an image to multiple display panels, wherein the multiple display panels include a first display panel and a second display panel;
   dividing, via a display driver or a display controller, the image between the first display panel and the second display panel, wherein a division of the image uses a multi-window technique based on at least one of a central processing unit (CPU) or a graphics processing unit (GPU), wherein the first display panel includes a first resolution and the second display panel includes a second resolution that is different from the first resolution, wherein communication of the image is to both the first display panel and the second display panel prior to the division of the image using the multi-window technique, and wherein the first display panel and the second display panel include a bus interface and the display driver;
   scaling, via the display driver or the display controller, a first portion of the image to the first display panel and a second portion of the image to the second display panel, wherein a size of the first portion of the image is configurable by hardware and a size of the second portion of the image is configurable by the hardware, wherein the display driver or the display controller is configured to scale the first portion of the image based on the first resolution and the second portion of the image based on the second resolution; and
   displaying the scaled first portion of the image on the first display panel and the scaled second portion of the image on the second display panel, wherein the displayed first portion of the image includes the first resolution and the displayed second portion of the image includes the second resolution.

2. The method of claim 1, wherein a position of the first portion of the image is configurable and a position of the second portion of the image is configurable.

3. The method of claim 2, wherein the first portion of the image and the second portion of the image are configured with a display command or a control command.

4. The method of claim 1, wherein the first display panel corresponds to the first portion of the image and the second display panel corresponds to the second portion of the image.

5. An apparatus for display processing, comprising:
   memory; and
   at least one processor coupled to the memory and configured to:
      communicate an image to multiple display panels, wherein the multiple display panels include a first display panel and a second display panel;
      divide, via a display driver or a display controller, the image between the first display panel and the second display panel, wherein a division of the image uses a multi-window technique based on at least one of a central processing unit (CPU) or a graphics processing unit (GPU), wherein the first display panel includes a first resolution and the second display panel includes a second resolution that is different from the first resolution, wherein communication of the image is to both the first display panel and the second display panel prior to the division of the image using the multi-window technique, and wherein the first display panel and the second display panel include a bus interface and the display driver;
      scale, via the display driver or the display controller, a first portion of the image to the first display panel and a second portion of the image to the second display panel, wherein a size of the first portion of the image is configurable by hardware and a size of the second portion of the image is configurable by the hardware, wherein the display driver or the display controller is configured to scale the first portion of the image based on the first resolution and the second portion of the image based on the second resolution; and
      display the scaled first portion of the image on the first display panel er and the scaled second portion of the image on the second display panel, wherein the displayed first portion of the image includes the first resolution and the displayed second portion of the image includes the second resolution.

6. The apparatus of claim 5, wherein a position of the first portion of the image is configurable and a position of the second portion of the image is configurable.

7. The apparatus of claim 6, wherein the first portion of the image and the second portion of the image are configured with a display command or a control command.

8. The apparatus of claim 5, wherein the first display panel corresponds to the first portion of the image and the second display panel corresponds to the second portion of the image.

9. An apparatus for display processing, comprising:
   means for communicating an image to multiple display panels, wherein the multiple display panels include a first display panel and a second display panel;
   means for dividing, via a display driver or a display controller, the image between the first display panel and the second display panel, wherein a division of the image uses a multi-window technique based on at least one of a central processing unit (CPU) or a graphics processing unit (GPU), wherein the first display panel includes a first resolution and the second display panel includes a second resolution that is different from the first resolution, wherein communication of the image is to both the first display panel and the second display panel prior to the division of the image using the multi-window technique, and wherein the first display panel and the second display panel include a bus interface and the display driver;

means for scaling, via the display driver or the display controller, a first portion of the image to the first display panel er and a second portion of the image to the second display panel, wherein a size of the first portion of the image is configurable by hardware and a size of the second portion of the image is configurable by the hardware, wherein the display driver or the display controller is configured to scale the first portion of the image based on the first resolution and the second portion of the image based on the second resolution; and means for displaying the scaled first portion of the image on the first display panel er and the scaled second portion of the image on the second display panel, wherein the displayed first portion of the image includes the first resolution and the displayed second portion of the image includes the second resolution.

10. The apparatus of claim 9, wherein a position of the first portion of the image is configurable and a position of the second portion of the image is configurable.

11. The apparatus of claim 10, wherein the first portion of the image and the second portion of the image are configured with a display command or a control command.

12. The apparatus of claim 9, wherein the first display panel corresponds to the first portion of the image and the second display panel corresponds to the second portion of the image.

13. A non-transitory computer-readable medium storing computer executable code for display processing, the code when executed by at least one processor causes the at least one processor to:

communicate an image to multiple display panels, wherein the multiple display panels include a first display panel and a second display panel;

divide, via a display driver or a display controller, the image between the first display panel and the second display panel, wherein a division of the image uses a multi-window technique based on at least one of a central processing unit (CPU) or a graphics processing unit (GPU), wherein the first display panel includes a first resolution and the second display panel includes a second resolution that is different from the first resolution, wherein communication of the image is to both the first display panel and the second display panel prior to the division of the image using the multi-window technique, and wherein the first display panel and the second display panel include a bus interface and the display driver;

scale, via the display driver or the display controller, a first portion of the image to the first display panel and a second portion of the image to the second display panel, wherein a size of the first portion of the image is configurable by hardware and a size of the second portion of the image is configurable by the hardware, wherein the display driver or the display controller is configured to scale the first portion of the image based on the first resolution and the second portion of the image based on the second resolution; and display the scaled first portion of the image on the first display panel and the scaled second portion of the image on the second display panel, wherein the displayed first portion of the image includes the first resolution and the displayed second portion of the image includes the second resolution.

* * * * *